Nov. 25, 1924.

J. BATH 1,516,909

MICROMETER CALIPER

Filed July 14, 1919

Inventor
John Bath
By Attorney
Geo. H. Kennedy Jr.

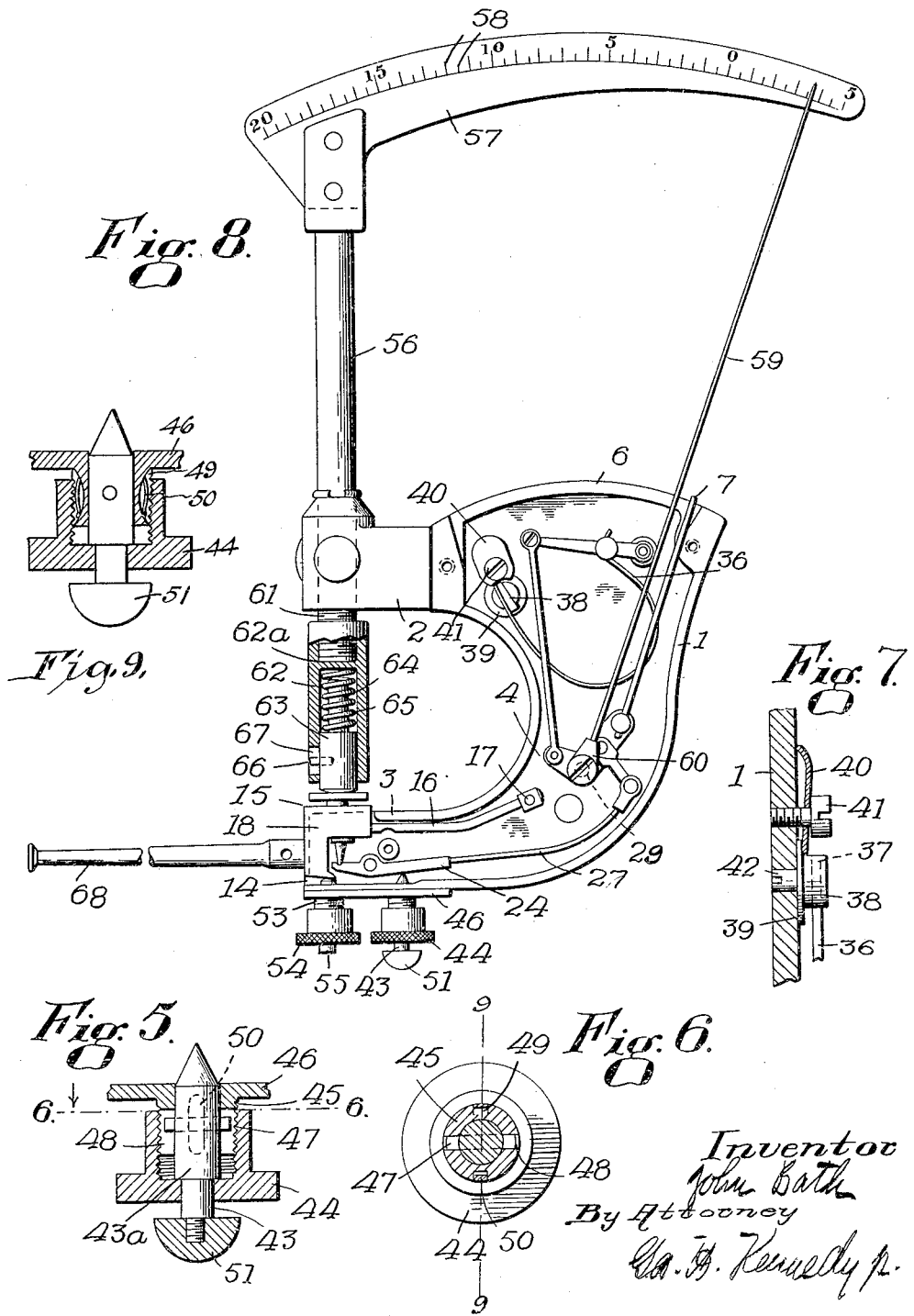

Patented Nov. 25, 1924.

1,516,909

UNITED STATES PATENT OFFICE.

JOHN BATH, OF WORCESTER, MASSACHUSETTS, ASSIGNOR TO JOHN BATH & COMPANY, INC., OF WORCESTER, MASSACHUSETTS, A CORPORATION OF MASSACHUSETTS.

MICROMETER CALIPER.

Application filed July 14, 1919. Serial No. 310,804.

*To all whom it may concern:*

Be it known that I, JOHN BATH, a citizen of the United States, residing at Worcester, in the county of Worcester and Commonwealth of Massachusetts, have invented a new and useful Improvement in a Micrometer Caliper, of which the following, together with the accompanying drawings, is a specification.

My invention relates to micrometer calipers of the type in which the calipering points or abutments are adapted to move relatively apart or toward each other against a yielding resistance, and in which the relative movement of the abutments is transmitted to a suitable indicating device which shows at once the dimension or difference from a given dimension of the object which acts upon the caliper points or abutments.

In U. S. Patent No. 1,202,019 issued to me on October 24, 1916, there is shown and described a micrometer caliper comprising relatively movable calipering abutments, one of which is connected to an indicating device through a transmission mechanism which is adapted to greatly multiply the movement transmitted from the movable caliper abutment to the indicating device. The transmission mechanism described in the above mentioned patent embodies certain principles of operation whereby the relative movement of the calipering abutments is transmitted to the indicating device with great accuracy, and errors in the operation of the instrument are substantially eliminated.

The object of my present invention is to provide a micrometer caliper of the same general type and embodying the same general principles of operation as my previously patented mechanism, with certain refinements in the construction and operation thereof, whereby the sensitiveness, accuracy, and general range of application of the instrument are greatly increased. These and other advantages of my present invention over the instrument described in the above mentioned patent will be more apparent after reference to the specification and the accompanying drawings.

Referring to the drawings,

Figures 4, 5, 6 and 7 are enlarged fragmentary views respectively, showing details of my instrument.

Figure 8 is a plan view similar to Fig. 2, showing an auxiliary multiplying device applied to my instrument.

Fig. 9 is a sectional view along the line 9—9, Fig. 6.

Like reference characters refer to like parts in the different figures.

Figure 3:
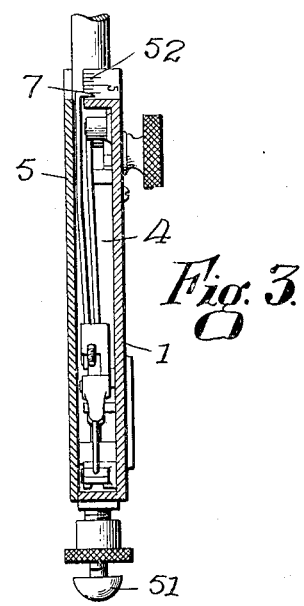
Figure 3 is a transverse sectional view along the line 3—3, Figure 2.

Referring to the drawings, the instrument generally comprises a frame or body 1, which is substantially U-shaped and is provided with arms 2 and 3 extending in approximately the same direction and separated by a space of sufficient width to receive the object to be measured. A portion of the frame 1 is recessed to provide a chamber 4 in which the moving parts of the instrument are located. This chamber 4 is normally closed by a detachable cover plate 5, shown in Fig. 3, which conforms to the outline of the frame 1 and is attached thereto by any suitable means. The wall of the chamber 4 is provided with a slot 6 through which projects an indicator 7, the purpose of which will be hereinafter described.

Figure 1:
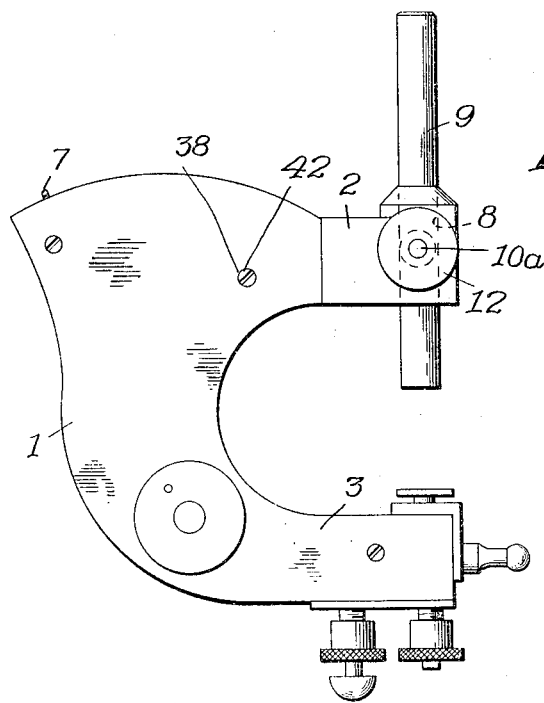
Figure 1 is a plan view of an instrument embodying my invention.
Figure 4:
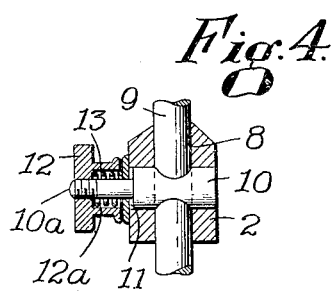

Referring to Figs. 1 and 4, the arm 2 of the frame 1 is provided with a slot 8 within which a bar 9 is adapted to slide. The bar 9 constitutes one of the calipering points or abutments of the instrument and is adapted to be held in any fixed position with respect to the arm 2 by means of a socket 10 located in a slot 11 which extends transversely through the slot 8, and provided with an opening through which the bar 9 extends. The socket 10 and the bar 9 are adapted to be clamped in the slot 8 by a thumb nut 12, coacting with a threaded reduced portion 10ᵃ of the socket 10 which projects beyond the arm 2. The nut 12 is provided with an internal recess 12ª within which is located a spring 13 surrounding the portion 10ª and tending to draw the socket 10 outwardly through the slot 11. The pressure of the spring 13 normally permits longitudinal movement of the bar 9, if a slight force is applied thereto, but when the nut is screwed down upon the portion 10ª the bar 9 is locked tightly in position.

The arm 3 of the frame 1 is also recessed so that it provides a continuation of the chamber 4 and the end wall thereof is cut away, as shown at 14, to receive a movable calipering abutment 15. The abutment 15 is carried at the end of a lever 16 which is pivotally mounted at one end on a pin 17. The abutment 15 comprises an L-shaped portion 18 that is provided with openings 19 and 20, the axes of which are at right angles to each other. The abutment 15 further comprises a detachable anvil foot 21 located in the opening 20 and a button-like anvil foot 22 having a reduced portion 22ª that is adapted to slide within the opening 19. The reduced portion 22ª is recessed to receive a round-headed thrust rod 23 for transmitting the motion of the lever 16 to a multiplying lever 24. The lever 24 is mounted on a pivot 25 located at a point adjacent the lower end of the thrust rod 23, and its short arm 26 is provided with a groove 26ª to receive the pointed end of the thrust rod 23, and thereby hold the collar 23ª against the portion 18. The long arm 27 of the lever 24 is connected to one arm 28ª of a bell crank lever pivoted on a pin 29 by means of a link 30 and suitable pivot pins 31 and 32. The indicator 7 which projects through the slot 6 in the chamber 4, as previously described, is secured on the free end of the arm 28ª. The other arm 28ᵇ of the bell crank lever is provided at its end with a link 33 that is pivotally connected to a lever 34. The lever 34 is pivoted at the point 35 and is held away from the bell crank lever by means of a U-shaped spring 36. One end of the spring 36 engages a projection 34ª of the lever 34 and the other end is located in a slot 37 that is provided in the end of an adjusting stud 38. As best shown in Fig. 7, the stud 38 is provided with a shoulder 39 that is engaged by the end of a plate 40 secured to the frame by a set screw 41. The stud is thus normally held in a fixed position, but it may be turned to adjust the spring 36 by inserting a tool in a slot 42 at the end of the stud and turning it against the pressure of the plate 40.

Figure 2:
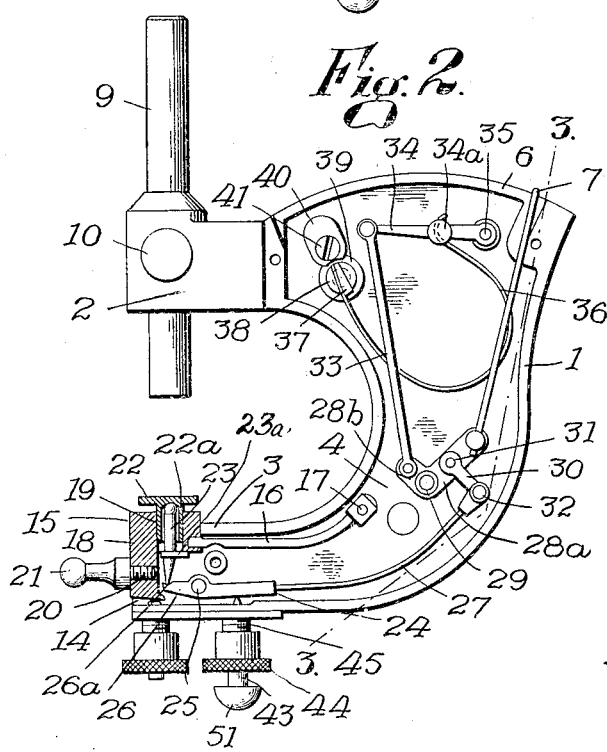
Figure 2 is a plan view similar to Fig. 1, looking from the other side, the cover of the instrument being moved to show the parts of the mechanism.

From the foregoing, it is apparent that the abutment 15 is normally held toward the fixed abutment bar 9 by means of the spring 36 acting through the bell crank lever, the multiplying lever 24 and the thrust rod 23, all members of the mechanism being substantially held in tension by the spring. In this position the indicator 7 is approximately at the end of the slot 6, as shown in Fig. 2. The normal position of the indicator 7 is determined, however, by a stop pin 43 which projects through the wall of the arm 3 and engages the long arm 27 of the multiplying lever at a point adjacent to the pivot 25. As best shown in Figs. 5 and 6, the position of the stop pin 43 is adapted to be adjusted by means of an internally threaded cap 44 which engages a shoulder 43ª of the pin and coacts with an externally threaded projection 45 secured to the bottom of the arm 2 by a plate 46, or in any other suitable manner. The pin 43 is provided with oppositely extending lugs or keys 47 that are located in slots 48 provided in the projection 45. The projection 45 is further provided with grooves 49 within which are located springs 50 in engagement with the threads of the cap 44, and the bottoms of the grooves 49, thus frictionally opposing the turning movement of the cap 44. The pin 43 is further provided at its outer end with a detachable anvil foot 51 which may be used as a feeling abutment, as will be hereinafter described. The stop pin 43 thus limits the movement of the multiplying lever 24 in a clockwise direction, and its adjustment provides means by which the indicator 7 can be set with respect to suitable scales that are provided along the edge of the slot 6, as shown at 52. In this way any movement of the abutment 15 may be read directly upon the scale 52, the divisions of the scale being determined by the ratio between the lever arms. The multiplication of the movement of the abutment 15 is here shown as being about one hundred times.

Referring to Fig. 8, the plate 46 is further provided with an externally threaded projection 53, and a cap 54 coacting therewith provides means for moving a stop pin 55 in the direction of the portion 18 of the abutment 15. The cap 54 and the pin 55 are provided with restraining means, not shown, similar to the springs 50 and the keys 47 provided on the stop pin 43. By screwing the cap 54 down upon the projection 53, the pin 55 is caused to move the abutment upwardly until the lever 16 engages the wall of the arm 3. The abutment is thereby locked against movement about its pivot 17 and the foot 22 or the foot 51 of the pin 43 may then be used as feeling abutments, the movement of which is transmitted directly to the long arm 27 of the multiplying lever. The foot 51 is then especially well adapted to measure the contour of moving surfaces, for it is apparent that the keys 47 prevent the foot 51 from turning, and thereby causing an undesirable turning movement of the pin 43 where it engages the arm 27.

An arrangement to give still greater multiplication of the movement of the moving abutment and by means of which very small movements thereof can be observed, is shown in Fig. 8. The frame and all parts of the lever system are the same as shown in Fig. 2, with the exception that the fixed abutment bar 9 is removed and a scale rod 56 substituted therefor. The upper end of the rod 56 is provided with a scale arm 57, the curved outer surface of which preferably has its center of curvature at the pivot pin 29 of the bell crank lever and is provided with scale markings 58. A scale pointer 59, provided at one end with a hollow socket 60 which fits over the pivot pin 29 and rotates with the bell crank lever, is adapted to swing along the scale markings 58. The inner end of the scale rod 56 is threaded at 61 to receive a sleeve 62 within which fits a plunger 63. The plunger is provided with a reduced portion 64 which is surrounded by a spring 65 having its upper end in engagement with a partition 62ª provided in the sleeve 62. The spring 65 forces the plunger 63 in the direction of the abutment 15 and tends to overcome and in effect counterbalance the effect of the spring 36. The tension of the spring 65 may be adjusted by the sleeve 62 to cause the pointer 59 to move to and remain temporarily at any place on the scale arm 57 to which it may be moved. This is due to the fact that the spring 65 acting through the plunger 63 exerts a constant pressure on the movable abutment 15, thus tending to move the pointer 59 against the action of the spring 36. Consequently, the pressure exerted by the spring 65 determines the exact position of the pointer 59 on the scale arm 57 for a given adjustment of the sleeve 62, so that the pointer 59 can be readily brought to, and maintained at the zero mark on the scale 57 before using the instrument. The plunger 63 is provided with a pin 66 located in a slot 67 of the sleeve 62 for limiting the movement thereof. The abutment 15 is provided with a long feeling arm 68, in place of the foot 21 of Fig. 1, by means of which movement imparted to the outer end of the arm 68 is transmitted to the multiplying lever 24. With the spring 65 adjusted to hold the pointer 59 at a predetermined scale mark 58, it is obvious that very small movements of the end of the arm 68 will be many times multiplied by the pointer 59, which will always indicate the deviation of the surface with which the end of the arm 68 is in contact, from any given scale marking 58 to which the pointer 59 has been previously set by means of the sleeve 62. In this way, the arm 59 can be caused to read to either the left or to the right of the zero marking on the scale 57, or readings may be taken with reference to any other scale marking 58 to which the pointer 59 may be set by turning the sleeve 62. This arrangement is of great advantage when measuring an uneven surface, portions of which may either be above or below a given plane of reference, to which the pointer 59 may be set.

From the foregoing, it is apparent that an instrument, constructed in accordance with my invention may be used to either measure the width of an object located between the fixed abutment bar 9 and the foot 22 of the movable abutment 15, or that it may be used to determine the character and amount of eccentricity, or the deviation from a reference plane of a rotating or travelling piece of work, by means of the arm 68 or the feet 21 and 51.

The advantages of an instrument embodying my present invention, as compared with my previously patented device lie partly in the fact that the movable abutment together with its transmitting mechanism is maintained in its normal or zero position by means of an adjustable spring acting at a point near the pivotal support of the bell crank lever which controls the movement of the indicator. In this way the whole transmitting mechanism is under a slight amount of tension so that there is no lost motion between the ends of the indicator and the movable abutment. The sensitiveness and accuracy of the instrument are greatly increased thereby, for it is apparent that the whole mechanism moves substantially as one member. In addition, the adjustment of the spring by swinging its fixed end allows slight changes in the tension thereof caused by variations in the temperature to be compensated for, and the use of this adjustment in connection with the adjustable foot 51 acting directly on the multiplying lever also permits the instrument to be set with great accuracy. The relatively long pointer 59 and the counterbalancing of the springs provides means by which an additional direct multiplication of the movement of the object measured is obtained, thus rendering the instrument extremely sensitive to very small eccentricities or slight deviations from a plane surface and allowing these deviations to be accurately determined.

In addition, the arrangement of the foot 22 for sliding movement on the abutment 15 permits the foot 22 to be used independently of the foot 21, while the provision of the collar 23ª on the thrust rod 23 allows the use of the foot 21 independently of the foot 22. The thrust rod 23 transmits the movement of either foot to the multiplying lever 24. It is to be noted that all of the anvil feet are detachable and therefore adapted to be interchanged with feet having other forms, especially adapted for different sorts of work.

I claim,—

1. In a micrometer caliper, the combination with a pivotally mounted main abutment, a multiplying lever and a member for transmitting movement of said abutment to said lever, of a device for locking said abutment against pivotal movement and an auxiliary abutment located adjacent to the pivotal point of said lever for acting on said lever when the main abutment is locked.

2. In a micrometer caliper, the combination with a pivotally mounted main abutment, a lever having arms of unequal length and means for transmitting movement of said abutment to the short arm of said lever, of means for locking said abutment against movement, and an auxiliary abutment acting on the long arm of said lever when said main abutment is locked.

3. In a micrometer caliper, the combination with a pivotally mounted main abutment, a multiplying lever and a member for transmitting movement of said abutment to said lever, of an adjustable member adapted to serve as a stop for said lever and as an auxiliary abutment movable independently of said main abutment.

4. In a micrometer caliper, the combination with a pivotally mounted main abutment, a multiplying lever and a member for transmitting movement of said abutment to said lever, of a movable member extending substantially at right angles to the pivotal axis of said lever, the normal position of said member serving to limit pivotal movement of said lever in one direction, and movement of said member serving to turn said lever independently of said main abutment.

5. In a micrometer caliper, the combination with a pivotally mounted lever, a movable stop for said lever and an adjusting member for controlling the movement of said stop, of means for opposing movement of said adjusting member and for preventing turning movement of said stop.

6. In a micrometer caliper, the combination with a pivotally mounted lever, a movable stop for said lever and an adjusting member for controlling the movement of said stop, of frictional means for opposing turning movement of said adjusting member and positive means for locking said stop against turning movement.

7. In a micrometer caliper, a frame provided with a projection, a stop movable within said projection, a cap in threaded engagement with said projection for positioning said stop, positive means for preventing turning of said stop within said projection, and frictional means for opposing turning of said cap.

8. In a micrometer caliper, the combination with a pivotally mounted calipering abutment, a pivotally mounted indicator, transmission mechanism between said abutment and said indicator, and a spring opposing movement of said indicator in one direction, of means acting directly on said abutment for opposing said spring, whereby said indicator may be set at a predetermined point.

9. In a micrometer caliper, the combination with a pivotally mounted calipering abutment, a pivotally mounted indicator, transmission mechanism between said abutment and said indicator, and a spring opposing movement of said indicator in one direction, of an arm extending toward said abutment and provided at one end with adjustable means for opposing said spring and at the other end with a scale for said indicator, whereby said indicator may be set at a predetermined point on said scale.

10. In a micrometer caliper, the combination with a pivotally mounted calipering abutment, a pivotally mounted indicator, transmission mechanism between said abutment and said indicator, and a spring opposing movement of said indicator in one direction, of an arm extending toward said abutment and provided at one end with adjustable spring means for opposing said spring and at the other end with a curved scale having its center of curvature at the pivotal point of said indicator.

11. In a micrometer caliper, a pivotally mounted main abutment provided with an opening for loosely receiving an anvil foot, a multiplying lever and a thrust rod for transmitting the movement of either said main abutment, or of said anvil foot to said lever.

12. In a micrometer caliper, a pivotally mounted main abutment provided with an opening for loosely receiving an anvil foot, a multiplying lever and a thrust rod resting at its lower end on said lever and supporting at its upper end said anvil foot.

13. In a micrometer caliper, a pivotally mounted main abutment provided with an opening for loosely receiving an anvil foot, a multiplying lever, and a thrust rod extending upwardly from said lever for supporting at its upper end said anvil foot, the said rod being provided with a projection for supporting said main abutment.

14. In a micrometer caliper, a pivotally mounted main abutment provided with an opening for loosely receiving an anvil foot, a multiplying lever, a thrust rod extending upwardly from said lever for supporting said main abutment and said anvil foot, and means for locking said main abutment against pivotal movement whereby movement of said anvil foot may be transmitted through said thrust rod independently of said abutment.

15. In a micrometer caliper, a pivotally mounted main abutment provided with an opening for loosely receiving an anvil foot, and a second anvil foot extending from said abutment at right angles to said first named anvil foot.

Dated this third day of July, 1919.

JOHN BATH.

Witnesses:
PENELOPE COMBERBACH,
GEO. H. KENNEDY, Jr.